(No Model.)
H. M. HALDEMAN.
BALL COCK VALVE.
No. 537,201. Patented Apr. 9, 1895.
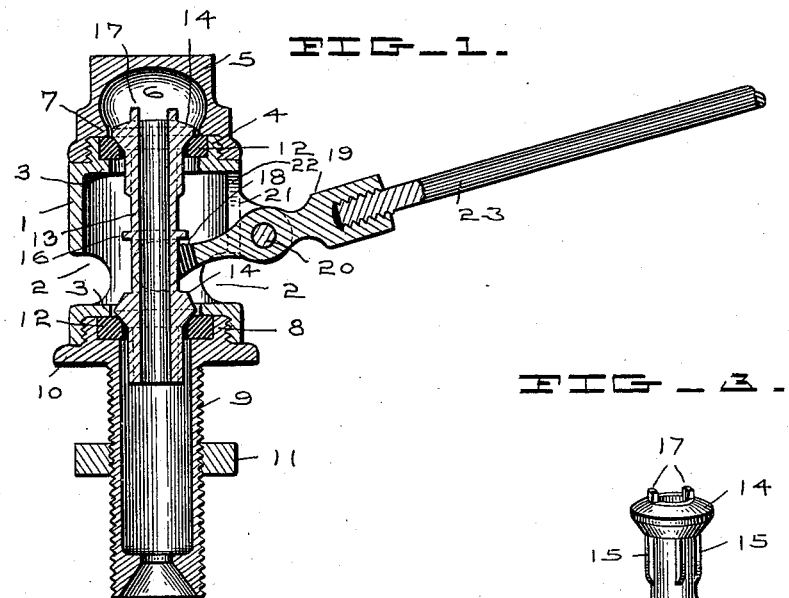
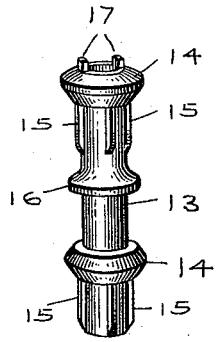
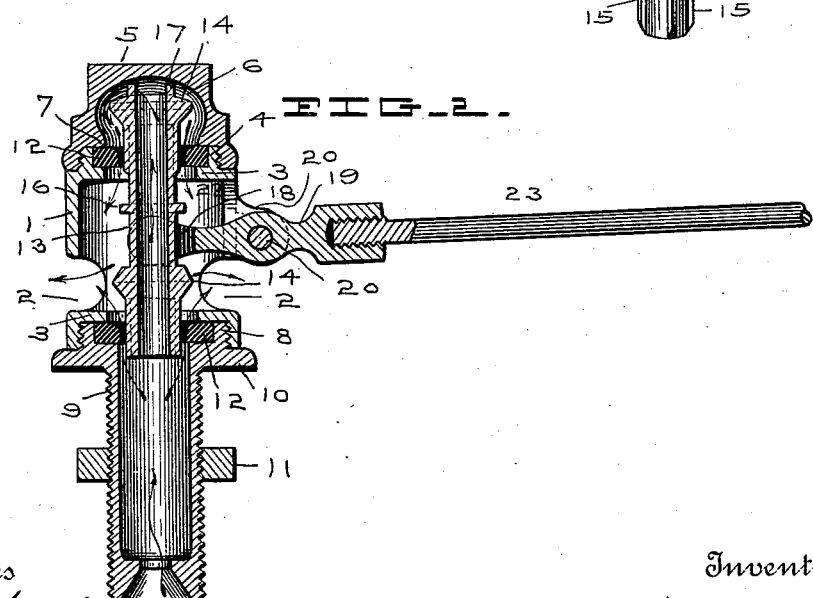
Witnesses
Inventor
Harry M. Haldeman
By Attorney

UNITED STATES PATENT OFFICE.

HARRY M. HALDEMAN, OF INDIANAPOLIS, INDIANA.

BALL-COCK VALVE.

SPECIFICATION forming part of Letters Patent No. 537,201, dated April 9, 1895.

Application filed July 5, 1894. Serial No. 516,580. (No model.)

*To all whom it may concern:*

Be it known that I, HARRY M. HALDEMAN, a citizen of the United States, residing at Indianapolis, in the county of Marion and State of Indiana, have invented certain new and useful Improvements in Ball-Cock Valves; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to new and useful improvements in what are known as ball cock valves, wherein a movable stem which carries the valve or valves is adapted to be moved, through an ordinary ball float connected to it by a lever and either open or close the valves on their seats and it will be understood from the following description, reference being had to the accompanying drawings, in which—

Figure 1 is a longitudinal section through a ball cock valve embodying my improvements, the valve being closed and the ball float and its lever being broken away. Fig. 2 is a similar view, the valve being open. Fig. 3 is a detail perspective view of the valve stem and its valves.

In detail, 1 represents a valve shell or casing which is open or cut away at the sides as at 2 and 3 are annular inner flanges formed on the valve shell both above and below. The upper end of the valve shell has an annular screw threaded extension 4 over which screws the removable cap 5, it being cored out as at 6 and has an inner annular flange 7 which is of less diameter than the extension 4. The lower end of the shell 1 is internally screw threaded to receive the annular screw threaded extension 8 formed on the end of the short pipe or nozzle 9, this nozzle having an annular collar 10 formed on its upper end which when the nozzle 9 is in place bears against the lower end of the valve shell 1.

The nozzle 9 is screw threaded below the annular collar 10 so that when the valve is set in place in a flushing tank, the nozzle or pipe 9 passing through its bottom the valve can be securely held in place by a nut 11 which screws on the nozzle. The lower end of the nozzle 9 is adapted to be connected with the water supply pipe below by any suitable coupling.

Fitting within the screw threaded extension 4 on the top of the valve shell and held in place between the annular flange 3 on the end of such shell and the annular flange on the inside of the screw cap 5 is an annular ring or washer 12 formed of any suitable material such as rubber or leather, this washer projecting slightly beyond the edges of the flanges and having the top of its inner face rounded off to form a valve seat as shown. This washer also serves as a packing for the joint between the valve shell 1 and the cap 5. The washer projecting beyond the edges of the flanges on the valve shell and cap also prevents the valve or its stem from coming into contact with such flanges and thus makes the operation of the valve perfectly noiseless.

Between the lower flange 3 of the valve shell and the end of the nozzle 9 is held in place a washer 12 similar to the first and which serves the same purposes.

13 is a hollow valve stem open at each end and 14 are valves formed on the outside thereof one at the top and one near the lower end, a number of narrow vertical wings 15 being formed on the outside of the stem below each valve.

16 is a collar or ring formed around the valve stem near its center and the top of the lower valve is squared off for the purpose hereinafter described.

17 are projections formed on the top of the valve stem above the upper valve to prevent the opening through such stem from being closed when the stem strikes the top of the cap 5 as shown in Fig. 2.

When the parts of the valve are put together the stem with its valves is put in place as shown in Figs. 1 and 2 the stem extending through the shell 1 and one of the valves being above each of the rings 12 which form their seats the wings 15 on the stem extending through these rings.

The bifurcated ends 18 of the operating lever 19 are engaged with the valve stem between the collar 16 and the lower valve 14. The lever 19 is pivoted at 20 to a bracket 21 formed on the side of the valve shell such lever working through a slot 22 in such shell.

The operating lever 19 is usually cast and a light rod 23 screwed into its outer end and to the end of this rod the ball float is secured.

The operation of the valve herein described is very simple, it being closed when the ball float in the flushing tank is raised and is opened by the dropping of the float when the water falls in the tank.

Upon the valves being lifted from their seats as shown in Fig. 2 a part of the water through the nozzle 12 will escape through the lower valve as indicated by arrows, but at the same time a part will also escape through the upper valve after passing through the hollow valve stem and through the cavity in the cap 5.

When the valves are closed as shown in Fig. 1 the water pressure being the same above the upper valve as below the lower one the entire valve is perfectly balanced and this is the case no matter what the water pressure may be. This perfect balance prevents the valve from jumping and rattling when "fire pressure" is on or when the pressure is temporarily increased from any cause.

As stated before the valve is perfectly noiseless the washers which form the valve seats only coming into contact with the valves and the wings of the valve stem, and these latter being very light there is but very little wear on the seats. The seats also serve as packing between the joints of the valve thus performing two offices as stated before.

Through the construction of the valve the seats are readily removed for by removing the valve cap the upper seat can be got at and by unscrewing the valve shell from the nozzle below the lower one is exposed. This too is accomplished without detaching the nozzle from the bottom of the flushing tank. If the valve is to be removed for any time and the nozzle needs to be closed it can be done by screwing the valve cap on the end of it.

Taken as a whole this valve is very simple and cheap in construction, has few parts to get out of order, is perfect in operation and readily repaired. It is obvious that its form and construction may be changed and it may be used for other purposes than herein specified without departing from my invention.

What I claim as new, and desire to secure by Letters Patent of the United States, is—

1. In a ball cock valve an open valve shell with seats at each end, a hollow valve stem having valves thereon seating on the seats of such shell, a hollow cap over one end of such shell and valve, and the other end of such shell connected with a water nozzle or pipe and means of operating such valves.

2. In a ball cock valve a shell open at both ends and sides, a water nozzle or pipe secured to one end of such shell and a hollow cap to the other, washers interposed between the several parts forming packing for the same and also valve seats, valves formed on a hollow stem and adapted to seat on such seats, and means of operating such valves.

3. In a ball cock valve, an open valve shell, openings in its top and bottom, the one opening into a hollow removable cap the other into a nozzle or water pipe, washers interposed between the several parts and projecting beyond the same, such washers forming packing for the joints and also valve seats, valves carried on a hollow valve stem, such valves seating on similar sides of each of the seats, projections formed on the top of the valve stem, and wings below each of the valves with means for operating said valves.

In testimony whereof I affix my signature in presence of two witnesses.

HARRY M. HALDEMAN.

Witnesses:
H. D. NEALY,
J. B. KNICKERBOCKER.